United States Patent [19]

Pakki et al.

[11] 4,251,375

[45] Feb. 17, 1981

[54] FILTERING APPARATUS

[76] Inventors: Viktor I. Pakki, Krasnoshkolnaya naberezhnaya, 18, kv. 132; Chingiz S. Guseinov, Krasnoshkolnaya naberezhnaya, 18, kv. 249; Sabir Y. Bogdanovich, prospekt Lenina, 41/43, kv. 156; Petr D. Guzhin, ulitsa Sumskaya, 77/79, kv. 39, all of Kharkov, U.S.S.R.

[21] Appl. No.: 29,324

[22] Filed: Apr. 12, 1979

[51] Int. Cl.³ .............................................. B01D 29/20
[52] U.S. Cl. ...................... 210/304; 55/301; 55/522; 55/337; 210/433.1; 210/506; 210/340
[58] Field of Search ............... 210/448, 452, 456, 510, 210/502, 304, 340, 433 R, 506; 55/282, 301, 392–399, 522, 421, 337

[56] References Cited

U.S. PATENT DOCUMENTS

| | | | |
|---|---|---|---|
| 2,078,543 | 4/1937 | Salisbury | 210/448 X |
| 2,910,717 | 11/1959 | Raymond | 210/448 X |
| 3,382,904 | 5/1968 | Kuss | 210/448 |
| 3,537,593 | 11/1970 | Authrof | 210/448 X |
| 3,622,006 | 11/1971 | Brunner | 210/448 X |
| 3,724,669 | 4/1973 | Thal | 210/448 X |
| 4,128,513 | 12/1978 | Bariene et al. | 210/502 X |

*Primary Examiner*—John Adee
*Attorney, Agent, or Firm*—Lackenbach, Lilling & Siegel

[57] ABSTRACT

The apparatus comprises a hollow casing in the form of a solid of revolution having an inlet and an outlet, a spinner for imparting rotary motion within the casing to a fluid being purified, and a hollow filter element closed at one end, positioned coaxially within the casing and snugly fit with the open end in the outlet of the casing. The apparatus also includes a discharge connection piece for removal of the impurities that have been separated from the fluid being purified. The spinner is positioned at the inlet, and the discharge connection piece is attached to the lower portion of the casing. The filter element and the casing define a space tapering from the inlet toward the outlet, and the filter element being a frame with a covering having a water-repellent polymeric foam material applied thereto.

12 Claims, 10 Drawing Figures

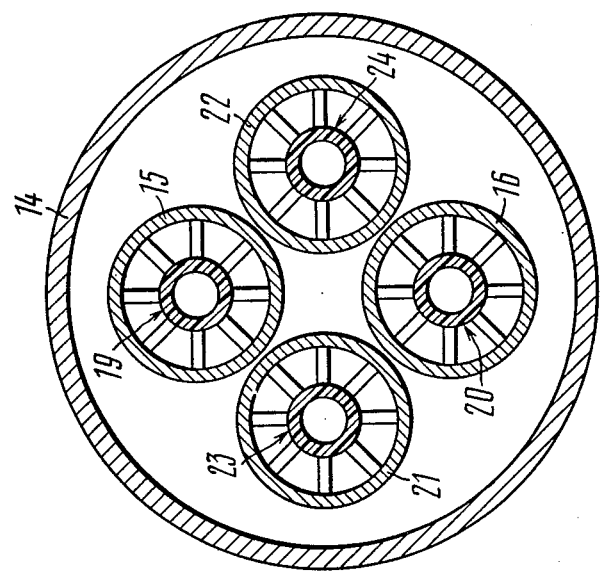
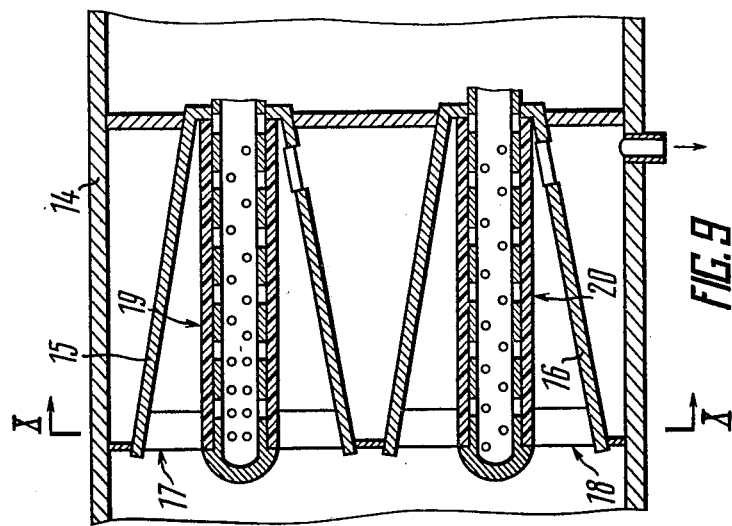

FILTERING APPARATUS

BACKGROUND OF THE INVENTION

1. Field of the Invention

The present invention relates to processing equipment for purifying fluids, namely, filtering apparatus.

The invention may be particularly advantageous when purifying natural gas by separating mechanical impurities, liquid hydrocarbon admixtures, and water, dispersed in the gas. Also, the apparatus of the present invention may be utilized for purifying and separating liquids, such as oils and fuels.

The degrees of purification in gases and liquids at high flow rates is a relatively longstanding problem, yet experience has not shown any satisfactory solution thereof. Recognition of this problem as being currently urgent can be seen by a great number of patents which have issued from 1965 to 1978 in different countries. Furthermore, the prior art fails to ensure 100% separation of disperse mechanical impurities and mists of liquids from gases at a high rate of flow, despite the fact that a demand for such ensured and full purification is continuously increasing with the development of nuclear engineering.

2. Description of the Prior Art

Principally two approaches to solving the problem were repeatedly attempted heretofore. It was 15 years ago that in some countries a filter comprising a hollow casing having an inlet and an outlet was used for purifying small volumes of natural gas at a low rate of flow. Contained within the casing was a filter insertion piece made of a porous material. Specifically, the filter insertion piece was made of a porous ceramic material due to an appreciable pressure of the gas being filtered. To the best of the applicant's knowledge, such filters have not been used on gas fields for a number of reasons due to disadvantages inherent in such an arrangement.

The most significant drawback of the structure in question is a frequent clogging of the filter insertion piece by solid particles and by sedimentation of heavy fractions from hydrocarbon condensate, which leads to the build-up of a pressure differential in advance of and behind the filter insertion piece, giving rise to unsafe stresses in the porous material. The filter insertion pieces would have been to be frequently replaced, and to provide for such a replacement, stand-by filtration systems would have to be designed and built. It is likewise noted that even the most effective filter cleaning methods presently employed do not provide for completely restoring the original characteristics of the filter material.

A further significant drawback of the filters making use of filter insertion pieces of a porous material is that the filtration process has to be a multistage one i.e., there have to be filter insertion pieces for both fine and coarse purification.

It will be understood by those skilled in the art that such an array of filter insertion pieces displays too great a resistance to dynamic loads and limits the output of such a filtration process (well yields in gas fields).

A different approach to solving the problem consisted in using gravity and centrifugal forces for separating mechanical and other impurities from the fluid to be filtered. Thus, the prior art includes the use of such centrifugal separators as disclosed in U.S. Pat. No. 3,201,924 and French Pat. No. 1,252,017. The apparatus of the type mentioned above comprises a hollow casing, an impeller or helical bore used as a spinner, and an expansion chamber. The gas to be purified is set in rotary motion, whereby mechanical impurities and small globules of suspended liquid under the action of centrifugal forces are thrown against the walls of the casing and trapped in the chamber.

An obvious advantage of such a purification system or arrangement is in the higher output of the purification process, a wholly satisfactory hydraulic resistance produced by the filtering apparatus and its being convenient in operation. However, as to a quality characteristic of the purification process carried out on the centrifugal separators, it is worse than that of filtering apparatus having filter insertion pieces made of a porous material. The centrifugal separators hardly separate particles of 100 $\mu$m when purifying gases, as has been shown by experimental data.

Known in the art is an attempt to combine the advantages of both the above types of separators as disclosed in U.S. Pat. No. 2,198,819.

The specification together with the drawings teaches the abovementioned apparatus which comprises a hollow cylindrical casing, a spinner, a hollow filter element and a discharge connection piece. The casing is provided with an inlet and an outlet. The cylindrical filter element is positioned coaxially within the casing and is fit with its open end in the outlet. The above filter element comprises a screen frame with a filter material made as a metal gauze.

In operation, the vanes of the spinner impart rotary motion within the casing to the flow of the fluid being purified. In doing this a portion of the foreign matter under the action of the centrifugal force is thrown against the walls of the casing and is discharged through the discharge connection piece, while the other portion, made up of fine mechanical particles and suspended moisture, is separated by the filter material. Consequently, such filtering apparatus is capable of a relatively prolonged operation without the need to replace the filter element, and a high output of the purifying process is ensured.

But even this apparatus, though showing the above-mentioned advantages, does not always meet quality requirements.

Entry of the fine particles into the filtered fluid, among other things, is not excluded, and is increasingly probable as the filtering element gets clogged, and is under the constant action of the turbulent upper boundary layer of the fluid being purified.

Besides, replacement of the filter elements is nevertheless imperative, but this presents considerable difficulties particularly in the case of separating radioactive dust from gases, for example.

To eliminate any clogging of a filter element was the object of an inventive apparatus for "wet" purification of gases as disclosed in U.S.S.R. Author's Certificate No. 575118. Natural gas and a number of other gaseous media are known to contain a suspended liquid which under specific conditions can form a thin film on the walls of the casing and of the filter element, which film permits gas to pass through the filter element, but precludes entry or stands in the way of disperse particles.

To utilize this principle of purifying, the apparatus involved, comprising a hollow casing, a spinner and a hollow filter element, was provided with the hollow filter element formed as a cylindrical frame covered with a fluorine plastic. The spinner was described as positioned at the inlet within the casing, and the open end of the filter element fit in the outlet. The casing and the filter element were coaxially positioned cylinders equally spaced along the length of the latter.

A fluorine plastic covering, being water-repellent with a dynamically smooth surface, was conceived to provide a protective liquid film over the outer surface of the filter element when the gas-filtrant revolves within the casing, and at the same time prevent ingress of the film into the pores. As the film grew in thickness, the liquid, while breaking away from the fluorine plastic covering, was to carry separated disperse particles and liquid impurities to the circumference of the casing. The filter element could not clog and this would be clearly a solution of the problem.

But regardless of the concept being accurate and promising, investigation and tests have shown that disperse mechanical particles, hydrocarbon condensate and moisture were blocked from penetrating the pores of a water-repellent material only over that portion of the filter element which is adjacent the inlet. Moreover, an analysis of the gas-filtrant has shown the presence of hydrocarbon condensate and moisture therein.

SUMMARY OF THE INVENTION

The principal object of the present invention is to provide a filtering apparatus wherein clogging of the filter element is elminated along the length thereof.

A further object of the invention is to provide a filter apparatus which assures separation of all the moisture, hydrocarbon condensate and other liquid impurities found in a state of dispersion.

Yet another important object of the present invention is to provide a filtering apparatus characterized by a prolonged period between shutdowns for filter cleaning which will be equal to the overhaul period.

An additional object of the invention is to provide a filtering apparatus which requies less labor when in operation.

A still further object of the invention is to provide a filtering apparatus having a higher output than those of the prior art.

These and other objects of the present invention are attained in a filtering apparatus comprising a hollow casing formed as a solid of revolution and having an inlet and an outlet, a spinner positioned at the inlet, and a hollow filter element closed at one end, and positioned within the casing in spaced and coaxial relationship thereto. The hollow filter element is snugly fit with its open end in the outlet of said casing and comprises a frame and a covering of a water-repellent polymeric foam material; a discharge connection piece is attached to the lower portion of the casing, wherein, according to the invention, the casing and the filter element diameters at the inlet differ are greater than those at the outlet, and the space between the casing and the filter element tapers and gets narrower from the inlet toward the outlet.

Such an arrangement makes it possible to substain the circumferential speed of the revolving liquid film within a range sufficient for the film to streamline the porous surface of the filter element along the length thereof without breaking away. Presence of the protective liquid film over the filter element surface precludes clogging of the pores of a water-repellent material. This effect is most representative in the process of purifying natural gas.

That the liquid film streamlines the filter element without breaking away provides for separation of all the hydrocarbon condensate, moisture, and mechanical impurities, and also prevents their passage through the outlet. For the reasons given above, the period of operation of a filtering apparatus between filter cleaning shutdowns can be prolonged or extended to equal the overhaul period for the whole of the filtering apparatus, and thus labor can be substantially reduced for the time when the filtering apparatus is in operation.

The filtering apparatus of the present invention yields the best results when the ratio between the diameters of the casing and of the filter element is from 2 to 3 at the inlet, and from 1 to 2 at the outlet.

The filtering apparatus of the present invention may be modified so as to have the filter element formed as a cylinder and the casing as a cone tapering from the inlet toward the outlet.

It is in conformity with the object of the invention to use a fluorine plastic as the water-repellent polymeric foam material for the covering for the conical casing and the cylindrical filter element.

This modification is preferable for purifying fluids at 8 to 10 kg/cm$^2$.

An alternative version of the apparatus with the casing having the form of a cylinder, and the filter element having that of a cone tapering from the inlet toward the outlet is within the scope of the invention.

Polypropylene may be used as the water-repellent polymeric foam material for the covering with the cylindrical casing and the conical filter element.

This modification may be useful for purifying liquids and gases at 150 kg/cm$^2$.

It is well within the scope of the present invention to modify the filtering apparatus so as to provide the casing in the form of a cone tapering from the inlet toward the outlet, and the filter element in the form of a cone expanding from the inlet toward the outlet.

For operation within the temperature range of from $-15°$ C. to $200°$ C., polyethylene is preferred as the water-repellent polymeric foam material for the covering with both the casing and the filter element having the form of a cone.

For operation with a fluid at a temperature above 200 degrees Centrigrade and with both the casing and the filter element being conical, a metalline silicon compound as the water-repellent polymeric foam material for the covering is preferred.

If the filter element extends for more than 1 m, it is preferable that sets of guide vanes be positioned in the tapering space between the casing and the filer element.

To raise the output of the filtration process, there may be a modified version of the apparatus, wherein a common housing contains at least two separate conical casings positioned in parallel, each of which comprises a separate filter element and a spinner.

BRIEF DESCRIPTION OF THE DRAWINGS

The exact nature of the present invention will be better understood from the following description of specific embodiments thereof taken in conjunction with the accompanying drawings, wherein:

FIG. 9 is a longitudinal sectional view through a modified version of the filtering apparatus comprising several filter elements and spinners; and FIG. 10 is a cross-sectional view through a modified version of the filtering apparatus along the line X—X of FIG. 9.

DESCRIPTION OF THE PREFERRED EMBODIMENTS

Figure 1:
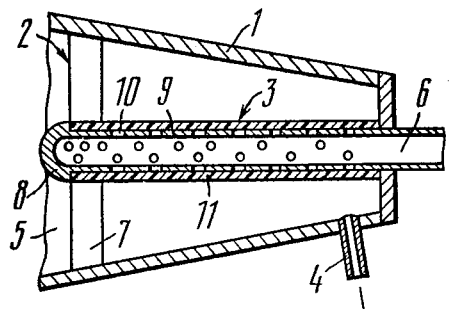
FIG. 1 is a longitudinal sectional view through the filtering apparatus of the present invention.

Referring to FIG. 1 of the accompanying drawings, a filtering apparatus comprises a hollow casing 1, a spinner 2, a filter element 3 and a discharge connection piece 4. The hollow casing 1 is formed as a solid of revolution and has an inlet 5 and an outlet 6. The spinner 2 is positioned at the inlet 5 of the casing 1 and may be variously shaped. Specifically, the spinner 2 may be a set of guide vanes 7 extending radially within the casing 1. Alternately, the spinner 2 may be constructed as an impeller connected to a suitable drive mechanism, as a cylindrical headpiece provided with helically projecting members within the central bore, and others (not shown).

The filter element 3 is also constructed as a hollow solid of revolution and is in coaxially spaced relationship with the casing 1.

The end of the filter element 3 turned to the inlet 5 is closed with a streamline plug 8. The other open end of the filter element 3 is snugly fit with the outlet 6 of the casing 1. Said filter element 3 comprises a frame constructed as a perforated tube 9 having openings 10 in the walls thereof. A covering 11 from a water-repellent polymeric foam material e.g. fluorine plastic, polyethylene, polypropylene or metalline silicon compound is applied to the outer surface of the perforated tube 9.

The discharge connection piece 4, as shown in the drawing, is attached to the casing 1 in the lower portion thereof.

According to the present invention, the casing 1 and the filter element 3 are constructed in such a way that at the inlet 5 their diameters differ greater than at the outlet 6, and a space having an annular cross-sectional between the casing 1 and the filter element 3 tapers from the inlet 5 toward the outlet 6. Optimum are such relative dimensions of the apparatus wherein the ratio between diameters of the casing 1 and the filter element 3 at the inlet 5 is from 2 to 3, and from 1 to 2 at the outlet 6. To meet such conditions, three main modifications of the present invention are possible. Specifically, FIG. 1 shows the modification of the apparatus wherein the filter element 3 is a cylinder and the casing 1 is a cone tapering from the inlet 5 toward the outlet 6. It is expedient to use in this speciifc case foam fluorine plastic as a material for covering 11.

Figure 2:
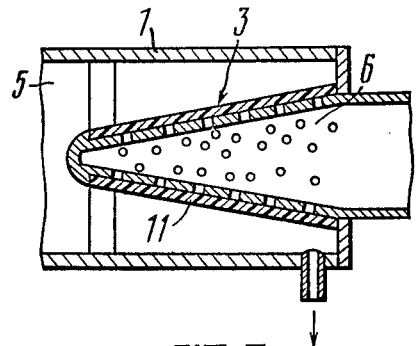
FIG. 2 is a longitudinal sectional view through an alternative version of the filtering apparatus embodying a cylindrical casing and a conical filter element.

FIG. 2 shows another modification of the apparatus of the present invention. This modification provides for a cylindrical casing 1 and a conical filter element 3, with the filter element 3 being expanded from the inlet 5 toward the outlet 6. In this case it is expedient to use foam polypropylene as a material for covering 11.

Figure 3:
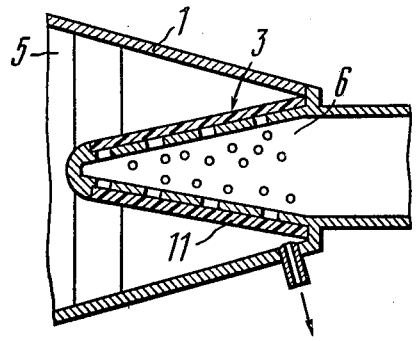
FIG. 3 is a longitudinal sectional view through a modified version of the filtering apparatus embodying a conical casing and a cylindrical filter element.

It is also possible to provide such modification of the apparatus shown in FIG. 3 of the accompanying drawings, wherein both the casing 1 and the filter element 3 are conical. In this modification the casing 1 is a cone tapering from the inlet 5 toward the outlet 6, and the filter element 3 is a cone expanding from the inlet 5 toward the outlet 6. When operating said modification for purifying media within the temperature range of from $-15°$ C. to $200°$ C., foam polyethylene is preferred as the material for covering 11. When operating the apparatus within a wider temperature range, the foam covering 11 of the filter element 3 should be made preferably from metalline silicon compounds, polyalumoorganosiloxanes or polytitanorganosiloxanes, for example.

Figure 4:
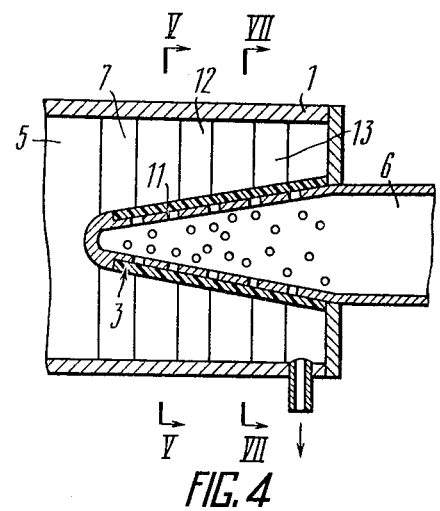
FIG. 4 is a longitudinal sectional view through a still further modified filtering apparatus provided with sets of guide vanes.
Figure 5:
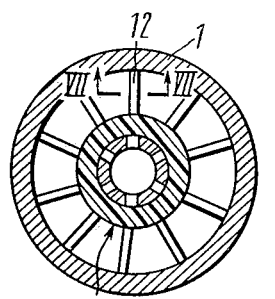
FIG. 5 is a cross-sectional view through the filtering apparatus of the present invention along the line V—V of FIG. 4.
Figure 7:
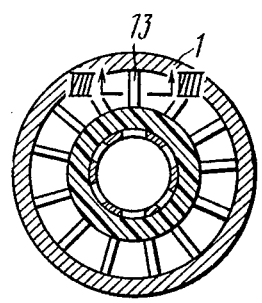
FIG. 7 is a cross-sectional view through the filtering apparatus of the present invention along the line VII—VII of FIG. 5.
Figure 6:
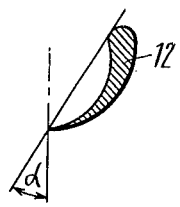
FIG. 6 is a cross-sectional view through a guide vane along the line VI—VI of FIG. 5.
Figure 8:
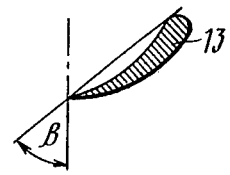
FIG. 8 is a cross-sectional view through a guide vane along the line VIII—VIII of FIG. 7.

Now consider FIG. 4 of the accompanying drawings showing a version of the filtering apparatus of the present invention wherein the length of the filter element 3 exceeds 1 m. For the purpose of stabilization of the protective liquid film onto the surface of the water-repellent covering 11 in the given modification, complementary sets of the guide vanes 12 and 13 are provided, and said sets are positioned in series within the tapering space between the casing 1 and the filter element 3. The sets of the guide vanes 12 and 13 are shown in FIG. 5 and FIG. 7 in cross-sectional detail where it can be seen that said vanes 12 and 13 are positioned radially and attached with the ends thereof to the casing 1 and the perforated tube 9 of the filter element 3. As shown in FIG. 6 and FIG. 8 of the accompanying drawings, the setting angle of the vanes 12 is less than that designated $\beta$ of the vanes 13 for the purpose of providing effective turbulence of the flow along the whole length of the filter element 3.

The modification of the apparatus shown in FIG. 9 of the accompanying drawings is preferred, when purifying fluids at greater flow rates. According to the invention, this modification provides for a common housing 14 comprising several (at least two) separate conical casings 15 and 16 mounted therein, each casing having separate spinners 17 and 18, and separate filter elements 19 and 20 positioned therein. FIG. 10 of the accompanying drawings shows as arrangement of four conical casings 15, 16, 21 and 22 having filter elements 19, 20, 23 and 24, within the housing 14.

When purifying gases which do not contain any moisture or disperse liquid impurities, it is preferred to position a moistener at the inlet of the apparatus, and the moistener may be in the form of an injector, for example (not shown).

Now consider operation of the filtering apparatus when utilizing it for purifying natural gas.

Purified gas is flowing through the inlet 5 of the casing 1 to the spinner 2 which imparts rotary motion to the flow of gas within the space between the casing 1 and the filter element 3. As the gas is spinned, the moisture contained therein in suspended liquid state, forms a rotating protective film over the surface of covering 11. Larger droplets of moisture and particles of mechanical impurities under the action of the centrifugal forces are circumferentially thrown against the inner surface of the walls of the casing 1 where they also form a rotating protective liquid film. The space tapering from the inlet 5 toward the outlet 6 provides for maintenance of linear speed of the spinned flow within the range sufficient for the rotating film to streamline the filter element 3 without breaking away along the length thereof. There is thus formed and continuously maintained a protective liquid film which does not penetrate into the pores of the covering material 11 due to water-repellent properties thereof, but said film stands in the way of such disperse impurities as a mist of hydrocarbon condensate and mechanical particles sizing less than 50 $\mu$m. As the film over the filter element 3 is growing in thickness, the liquid is separated from the water-repellent covering 11 and is thrown against the walls of the casing 1 carrying away separated fine particles and liquid impurities. The liquid together with the impurities is continuously removed from the apparatus through the discharge connection piece 4. While separating the fine particles and droplets of liquid impurities, the rotating protective film 11 does not, however prevent purified gas from passing through the pores of the covering 11 and openings 10 in the filter element 3. The purified gas leaves the cavity of the filter element through the outlet 6.

When purifying commercial gases which do not contain any moisture or which contain amounts of said moisture which are insufficient to form a stable protective liquid film, some water or solution of a liquid reagent are injected into the inlet, and said liquids absorbing the impurities and providing for the growth of the protective film.

When purifying gases by means of the modification of the apparatus shown in FIG. 4 of the accompanying drawings, the circumferential speed of the flow is maintained within the desired range by narrowing the space between the casing 1 and the filter element 3, as well as by making use of additional sets of guide vanes 12 and 13.

The modification of the apparatus shown in FIGS. 9 and 10 of the accompanying drawings operates as described above; the only difference is that the flow of the fluid being purified is separated within the common housing 14 between the separate filtering assemblies.

The above described apparatus may be also used for purifying and separating liquids from mechanical particles and liquid impurities if density of the liquid impurities is greater than that of the liquid being purified (specifically, in purifying fuels and oils from water).

It is to be understood that only some specific embodiments of the invention have been described above, though other modifications are possible without departing the scope of the present invention as set forth in the following claims.

What is claimed is:

1. A filtering apparatus comprising:
   a hollow casing formed as a solid of revolution and having an inlet and an outlet;
   a spinner positioned at the inlet of said casing and adapted to impart rotary motion within said casing to a fluid being purified;
   a hollow filter element closed at one end, and positioned coaxially within said casing to define together with said casing a space tapering from the inlet toward the outlet; and said filter element further being snugly fit with the open end thereof in the outlet and comprising
   a perforated frame, and
   a covering of a water-repellent polymeric foam material applied to said perforated frame;
   a discharge connection piece attached to the lower portion of said casing and adapted for removal of the impurities that have been separated from the fluid being purified; and the ratio between diameters of said casing and said filter element is from 2 to 3 at the inlet of said casing, and from 1 to 2 at the outlet thereof.

2. A filtering apparatus as set forth in claim 1, wherein said filter element is cylindrical, and said casing is conical tapering from the inlet toward the outlet thereof.

3. A filtering apparatus as set forth in claim 2, wherein the water-repellent polymeric foam material for said covering is a fluorine plastic, said casing being conical, and said filter element being cylindrical.

4. A filtering apparatus as set forth in claim 1, wherein said casing is cylindrical and said filter element is conical tapering from the inlet toward the outlet of said casing.

5. A filtering apparatus as set forth in claim 4, wherein the water-repellent polymeric foam material for said covering is polypropylene, said casing being cylindrical, and said filter element being conical.

6. A filtering apparatus as set forth in claim 1, wherein said casing is a cone tapering from the inlet toward the outlet thereof while said filter element is a cone expanding from the inlet toward the outlet of said casing.

7. A filtering apparatus as set forth in claim 6, wherein said water-repellent polymeric foam material for said covering is polyethylene, and said casing and said filter element being conical.

8. A filtering apparatus as set forth in claim 6, wherein the water-repellent polymeric foam material for said covering is a metalline silicon compound, said casing and said filter element being conical as well as the present invention being utilized for purifying hot gases and aggressive media.

9. A filtering apparatus as set forth in claim 1, wherein at least one set of guide vanes are positioned in the tapering space between said casing and said filter element in said apparatus where said filter element extends for more than 1 m.

10. A filtering apparatus as set forth in claim 1, wherein there is a common housing containing at least two separate conical casings positioned in parallel, each of which comprises separate filter elements and spinners.

11. A filtering apparatus as set forth in claim 9, wherein said spinner is a set of guide vanes extending radially within the casing.

12. A filtering apparatus as set forth in claim 1, wherein said spinner is an impeller connected to a drive mechanism.

* * * * *